(12) United States Patent
Yoshioka et al.

(10) Patent No.: US 11,502,791 B2
(45) Date of Patent: Nov. 15, 2022

(54) TERMINAL, RADIO COMMUNICATION METHOD, BASE STATION, AND SYSTEM

(71) Applicant: NTT DOCOMO, INC., Tokyo (JP)

(72) Inventors: Shohei Yoshioka, Tokyo (JP); Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/252,073

(22) PCT Filed: Jun. 15, 2018

(86) PCT No.: PCT/JP2018/023007
§ 371 (c)(1),
(2) Date: Dec. 14, 2020

(87) PCT Pub. No.: WO2019/239600
PCT Pub. Date: Dec. 19, 2019

(65) Prior Publication Data
US 2021/0258112 A1 Aug. 19, 2021

(51) Int. Cl.
*H04L 5/00* (2006.01)
*H04J 13/18* (2011.01)

(52) U.S. Cl.
CPC .......... *H04L 5/0012* (2013.01); *H04J 13/18* (2013.01); *H04L 5/001* (2013.01); *H04L 5/0051* (2013.01)

(58) Field of Classification Search
CPC ..... H04L 5/0012; H04L 5/001; H04L 5/0051; H04L 5/0053; H04J 13/18; H04B 1/7143
See application file for complete search history.

(56) References Cited

U.S. PATENT DOCUMENTS

| 2014/0179334 A1* | 6/2014 | Forenza ............ H04W 28/0236 455/452.2 |
| 2017/0187499 A1 | 6/2017 | Hwang et al. |
| 2019/0052421 A1* | 2/2019 | Yin ........................ H04L 5/005 |

(Continued)

FOREIGN PATENT DOCUMENTS

CN 107046513 A 8/2017

OTHER PUBLICATIONS

Extended European Search Report in counterpart European Application No. 18 92 2750.7 dated Nov. 29, 2021 (9 pages).

(Continued)

*Primary Examiner* — Christine Ng
(74) *Attorney, Agent, or Firm* — Osha Bergman Watanabe & Burton LLP

(57) ABSTRACT

A terminal is disclosed including a transmitter that transmits a demodulation reference signal for an uplink control channel; a receiver that receives: frequency hopping information indicating that frequency hopping of the uplink control channel is enabled, and information regarding a resource block index corresponding to a first frequency hop and a resource block index corresponding to a second frequency hop; and a processor that determines a sequence of the demodulation reference signal based on the frequency hopping information regardless of whether a distance between the first frequency hop and the second frequency hop is zero. In other aspects, a radio communication method, a base station, and a system are also disclosed.

7 Claims, 10 Drawing Sheets

(56) References Cited

U.S. PATENT DOCUMENTS

2019/0313401 A1* 10/2019 Wang .................. H04W 72/042
2019/0319823 A1* 10/2019 Akkarakaran ........ H04W 80/02
2021/0204272 A1*  7/2021 Lee .................... H04W 72/0413

OTHER PUBLICATIONS

International Search Report issued in PCT/JP2018/023007 dated Sep. 18, 2018 (1 page).
Written Opinion of the International Searching Authority issued in PCT/JP2018/023007 dated Sep. 18, 2018 (4 pages).
3GPP TS 38.213 V15.1.0; "3rd Generation Partnership Project; Technical Specification Group Radio Access Network NR; Physical layer procedures for control (Release 15)"; Mar. 2018 (5 pages).
3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
NTT Docomo et al.; "WF for OCC configuration of PF1"; 3GPP TSG RAN WG1 Meeting #93, R1-1807899; Busan, South Korea; May 21-25, 2018 (4 pages).
3GPP TS 38.211 V15.1.0; "3rd Generation Partnership Project; Technical Specification Group Radio Access Network NR; Physical channels and modulation; (Release 15)"; Mar. 2018 (102 pages).
Office Action issued in the counterpart Chinese Patent Application No. 201880094632.5, dated Dec. 14, 2021 (12 pages).
Lenovo, Motorola Mobility; "Remaining issues on long PUCCH design for UCI of more than 2 bits"; 3GPP TSG RAN WG1 #91, R1-1719748; Reno, United States of America; Nov. 27-Dec. 1, 2017 (4 pages).
WILUS Inc.; "Remaining issues on long PUCCH over multiple slots"; 3GPP TSG RAN WG1 Meeting AH 1801, R1-1800786; Vancouver, Canada; Jan. 22-26, 2018 (4 pages).
Office Action issued in Japanese Application No. 2020-525075 dated Apr. 26, 2022 (6 pages).

* cited by examiner

| PUCCH LENGTH | SF | | |
|---|---|---|---|
| | NO INTRA-SLOT HOPPING m' = 0 | INTRA-SLOT HOPPING | |
| | | 1st HOP m' = 0 | 2nd HOP m' = 1 |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

FIG. 1

TERMINAL, RADIO COMMUNICATION METHOD, BASE STATION, AND SYSTEM

TECHNICAL FIELD

The present invention relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). Further, for the purpose of further widening a bandwidth and increasing the speed in comparison with LTE, the succeeding systems of LTE (which are also referred to as, for example, LTE-A (LTE-Advanced), FRA (Future Radio Access), 4G, 5G, 5G+ (plus), NR (New RAT), LTE Rel. 14, Rel. 15 and later versions, or the like) are also under study.

In the existing LTE systems (for example, LTE Rel. 8 to Rel. 13), downlink (DL) and/or uplink (UL) communication is performed by using a subframe (also referred to as a transmission time interval (TTI) or the like) of 1 ms. The subframe is a transmission time unit of one channel-coded data packet, and is a processing unit of scheduling, link adaptation, retransmission control (HARQ (Hybrid Automatic Repeat reQuest)), or the like.

Further, in the existing LTE systems (for example, LTE Rel. 8 to Rel. 13), a user terminal transmits uplink control information (UCI) by using an uplink control channel (for example, a PUCCH (Physical Uplink Control Channel)) or an uplink data channel (for example, a PUSCH (Physical Uplink Shared Channel)). A configuration (format) of the uplink control channel is referred to as a PUCCH format (PF) or the like.

Further, in the existing LTE systems, a user terminal multiplexes a UL channel and a DMRS (Demodulation Reference Signal) and transmits the multiplexed data within a TTI of 1 ms. A plurality of DMRSs in different layers of one user terminal (or of different user terminals) are orthogonal-multiplexed within a TTI of 1 ms, by using a cyclic shift (CS) and/or an orthogonal spreading code (for example, an orthogonal cover code (OCC)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, LTE Rel. 15 or later versions, 5G, 5G+, NR, or the like), when UCI is transmitted by using the uplink control channel (for example, the PUCCH), application of frequency hopping is supported. In a similar manner, frequency hopping is also supported for a demodulation reference signal (DMRS) used for demodulation of the PUCCH.

If a transmission process (for example, sequence generation or the like) for the PUCCH or the DMRS in the user terminal cannot be appropriately controlled depending on whether frequency hopping is configured, communication quality may be deteriorated.

In view of this, the present disclosure has one object to provide a user terminal and a radio communication method that enable appropriate communication even when frequency hopping is applied to a UL channel.

Solution to Problem

A user terminal according to one aspect of the present invention includes: a receiving section that receives frequency hopping information indicating that frequency hopping of an uplink control channel is enabled, and information related to frequency hop resources; and a control section that determines a sequence to be applied to a demodulation reference signal for the uplink control channel, based on at least one of the frequency hopping information and a distance between frequency hops.

Advantageous Effects of Invention

According to the present invention, communication can be appropriately performed even when frequency hopping is applied to a UL channel.

BRIEF DESCRIPTION OF DRAWINGS

FIG. 1 is a diagram to show an example of association between a PUCCH length and SF;

DESCRIPTION OF EMBODIMENTS

Figures 2A, 2B:
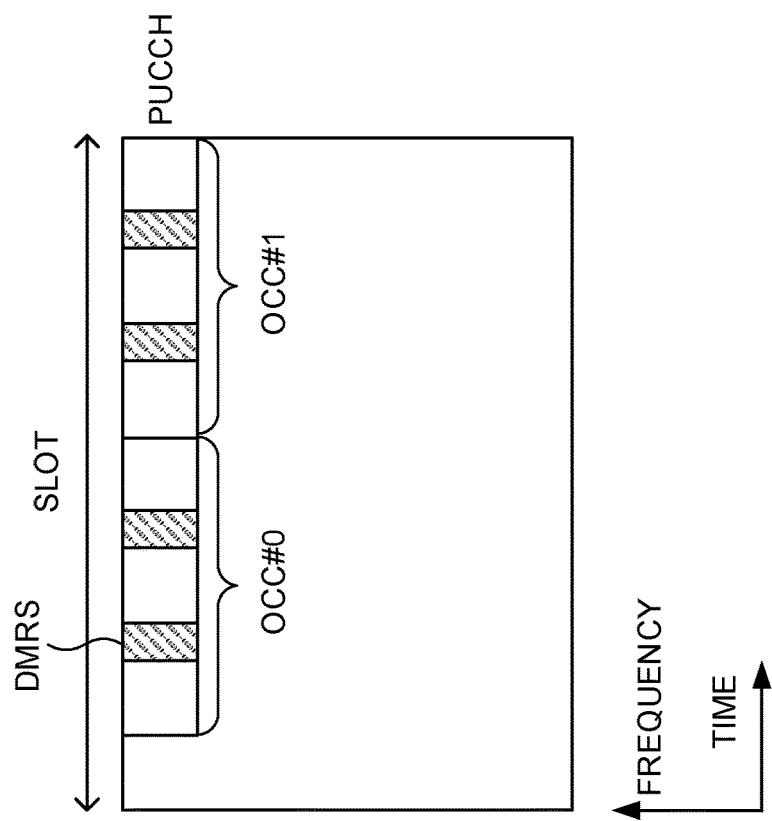
FIG. 2A and FIG. 2B are each a diagram to show an example of an orthogonal sequence determination method according to a first aspect.

In the future radio communication systems (for example, LTE Rel. 15 or later versions, 5G, NR, or the like), a configuration (also referred to as a format, a PUCCH format (PF), or the like) for an uplink control channel (for example, a PUCCH) used for transmission of UCI is under study. For example, in LTE Rel. 15, support of five types of PFs 0 to 4 is under study. Note that the term "PF" as used in the following description is merely an example, and a different term may be used.

For example, each of PFs 0 and 1 is a PF used for transmission of UCI of up to 2 bits (for example, transmission confirmation information (also referred to as a HARQ-ACK (Hybrid Automatic Repeat reQuest-Acknowledge), an ACK, a NACK, or the like). PF 0 can be allocated to 1 or 2 symbols, and is therefore also referred to as a short PUCCH, a sequence-based short PUCCH, or the like. In contrast, PF 1 can be allocated to 4 to 14 symbols, and is therefore also referred to as a long PUCCH or the like. In PF 1, a plurality of user terminals may be multiplexed in code division multiplexing (CDM) within the same resource blocks (physical resource blocks (PRBs)) by means of time domain block-wise spreading using at least one of a cyclic shift (CS) and an orthogonal sequence (for example, an OCC (Orthogonal Cover Code), or a time domain OCC).

Each of PFs 2 to 4 is a PF used for transmission of UCI of more than 2 bits (for example, channel state information (CSI) (or CSI and a HARQ-ACK and/or a scheduling request (SR))). PF 2 can be allocated to 1 or 2 symbols, and is therefore also referred to as a short PUCCH or the like. In contrast, each of PFs 3 and 4 can be allocated to 4 to 14 symbols, and is therefore also referred to as a long PUCCH or the like. In PF 4, UCI of a plurality of user terminals may be multiplexed in CDM by means of (frequency domain) block-wise spreading before DFT, by using an orthogonal sequence (for example, an OCC, a pre-DFT OCC, or a frequency domain OCC). In PF 4, UCI of a plurality of user terminals may be multiplexed in CDM by means of (frequency domain) block-wise spreading before DFT, by using a demodulation reference signal (DMRS).

The resources (for example, PUCCH resources) used for transmission of the uplink control channel are allocated by using higher layer signaling and/or downlink control information (DCI). Here, for example, the higher layer signaling may be at least one of RRC (Radio Resource Control) signaling, system information (for example, at least one of RMSI (Remaining Minimum System Information), OSI (Other system information), MIBs (Master Information Blocks), and SIBs (System Information Blocks)), and broadcast information (PBCH (Physical Broadcast Channel)).

In PF 1, the number of user terminals to be multiplexed using a time domain OCC is determined according to a PUCCH duration (also referred to as a Long-PUCCH duration or the number of symbols). The maximum number of user terminals to be multiplexed using a time domain OCC may also be referred to as an OCC multiplexing capacity, an OCC length, a spreading factor (SF), or the like.

When the UEs are multiplexed using a cyclic shift (CS) as well as the time domain OCC, the maximum value of the multiplexing capacity in given resources is calculated by "maximum value of OCC multiplexing capacity×number of CSs". The number of CSs may be a given value (for example, 12).

When the time domain OCC is applied to the PUCCH (for example, PF 1), it is necessary that the same base sequence be used (the same base sequence be applied) within a period in which one time domain OCC is multiplexed, from the point of view of maintaining orthogonality. Note that different values may be applied to the cyclic shift applied to the base sequence within the period in which one time domain OCC is multiplexed.

In NR, frequency hopping (FH) is supported for the PUCCH (for example, PF 1). FH includes intra slot FH (intra Slot Frequency Hopping) and inter slot FH (inter Slot Frequency Hopping). Intra slot FH may be referred to as PUCCH frequency hopping.

When intra slot FH is applied, for example, FH is performed by using 1st hop resources and 2nd hop resources. The 1st hop resources may be referred to as a 1st hop PRB, a first hop PRB, a first hop starting PRB, a starting PRB, a PRB prior to frequency hopping, a first for no frequency hopping, or a PRB corresponding to hopping index 0. The 2nd hop resources may be referred to as a 2nd hop PRB, a second Hop PRB, a second hop starting PRB, a PRB after frequency hopping, or a PRB corresponding to hopping index 1.

Indication as to whether PUCCH resources FH is enabled or disabled for FH (for example, intra slot FH) may be given to the UE by using a higher layer parameter (for example, PUCCH-frequency-hopping or intraSlotFrequencyHopping). Alternatively, indication that FH is enabled may be given to the UE, depending on presence or absence of a notification of the higher layer parameter. For example, the UE may determine that FH is enabled when there is a notification of the higher layer parameter (for example, PUCCH-frequency-hopping or intraSlotFrequencyHopping). The UE may determine that FH is disabled when there is no notification of the higher layer parameter.

The 1st hop PRB(s) and the 2nd hop PRB(s) may be independently notified to the UE from a base station. For example, the base station notifies the UE of information of a 1st hop PRB index (PRB-Id corresponding to startingPRB) and information of a 2nd hop PRB index (PRB-Id corresponding to secondHopPRB) by using the higher layer parameter. The UE determines the resources to be used in frequency hopping, based on the information related to the resources notified from the base station.

In this manner, when frequency hopping (for example, intra slot FH) for the PUCCH is supported, it is conceivable that the base station notifies the UE of the following higher layer parameters.
(1) Higher layer parameter indicating whether frequency hopping is applied (enable/disable) (for example, intraSlotFrequencyHopping)
(2) Higher layer parameter indicating the 1st hop PRB index (for example, startingPRB)
(3) Higher layer parameter indicating the 2nd hop PRB index (for example, secondHopPRB)

In this manner, when each of the higher layer parameters is notified, it is conceivable that a frequency-hop distance is 0 while notification about frequency hopping being enabled (intraSlotFrequencyHopping=enable) is given. The frequency-hop distance (also referred to as a PRB offset) refers to a distance between the 1st frequency hop and the 2nd frequency hop. A situation in which the frequency-hop distance is 0 is equivalent to a case where the 1st hop PRB index (startingPRB) and the 2nd hop PRB index (secondHopPRB) are the same.

In this case, how to control a transmission process (for example, generation of a sequence or the like) for the PUCCH (for example, PF 1) presents a problem.

For example, in PUCCH sequence generation, block-wise spreading using an orthogonal sequence (orthogonal sequence $W_i(m)$) may be performed based on Formula (1) below, for example.

[Formula 1]

$$z(m'N_{sc}^{RB}N_{SF,0}^{PUCCH,1} + mN_{sc}^{RB} + n) = w_i(m) \cdot y(n) \quad \text{Formula (1)}$$
$$n = 0, 1, \ldots, N_{sc}^{RB} - 1$$
$$m = 0, 1, \ldots, N_{SF,m'}^{PUCCH,1} - 1$$
$$m' = \begin{cases} 0 & \text{no intra-slot } frequencyhopping \\ 0,1 & \text{intra-slot } frequencyhoppingenabled \end{cases}$$

z: Transmitted sequence
$N_{sc}^{RB}$: Number of subcarriers in each resource block (RB)
$N_{SF,m'}^{PUCCH,1}$: Spreading factor (SF)

$$y(n) = d(0) \cdot r_{u,v}^{(\alpha,\delta)}(n)$$

$$n = 0, 1, \ldots, N_{sc}^{RB} - 1$$

$r_{u,v}^{(\alpha,\delta)}(n)$: Low-PAPR sequence defined by cyclic shift α of certain base sequence ($\bar{r}_{u,v}(n)$)

Note that $N_{SF,m'}^{PUCCH,1}$ may be determined based on certain table (see FIG. 1)

FIG. 1 shows a case where SF of the time domain OCC for PUCCH format 1 is associated with the PUCCH length (number of PUCCH symbols). No intra-slot hopping SF and intra-slot hopping SF may be associated with the PUCCH length. In this manner, a table showing SF for each value of the PUCCH length may be prescribed in a specification.

In Formula (1), one OCC is configured (m'=0) when intra slot FH is not applied, and two OCCs are configured (m'=0, 1) when intra slot FH is applied.

For example, when FH is applied, a 1st orthogonal sequence (orthogonal sequence using m'=0) is applied to the PUCCH corresponding to the 1st hop, and a 2nd orthogonal sequence (orthogonal sequence using m'=1) is applied to the PUCCH corresponding to the 2nd hop. In this manner, the orthogonal sequence to be applied to the PUCCH is different depending on whether FH is applied (enabled/disabled).

When FH is enabled and the frequency-hop distance is 0, how to control application of the orthogonal sequence to the PUCCH corresponding to the 1st hop and to the PUCCH corresponding to the 2nd hop presents a problem.

For example, it is conceivable to control the orthogonal sequence for the PUCCH, based on whether FH is applied, regardless of the frequency-hop distance. In this case, a UE with the frequency-hop distance being configured to 0 and a UE with the frequency-hop distance being configured to a value other than 0 (the 1st hop PRB index and the 2nd hop PRB index have different values) can be appropriately multiplexed.

Specifically, when the UE is notified of a higher layer parameter indicating that FH (for example, intra slot FH) is enabled, the UE generates a sequence or the like assuming FH, regardless of whether the frequency-hop distance is 0. Otherwise (for example, when the UE is not notified of a higher layer parameter indicating that FH is enabled or the like), the UE generates a sequence or the like assuming that FH is not applied.

Meanwhile, when FH is applied to the PUCCH for transmitting uplink control information (UCI), it is conceivable to support FH also for a demodulation reference signal (DMRS) for the PUCCH. In this case, how to control a transmission process (for example, generation of a sequence or the like) for the DMRS presents a problem.

In view of this, the inventors of the present invention have focused on application of FH to the DMRS used for demodulation of the PUCCH and have studied operation of the transmission process (for example, generation of a sequence or the like) for the DMRS, and have resulted in the present invention.

The present embodiment will be described below in detail. Aspects of the present embodiment described below may be independently applied, or may be applied in combination. Although the following description assumes intra slot FH, the present embodiment may be applied to inter slot FH. Although the following description takes an example of the DMRS for the PUCCH, the present embodiment may be applied to other reference signals.

In the following description, although PUCCH format 1 is described as an example of the PUCCH, applicable PUCCH formats are not limited to this PUCCH format. In the following description, "generation of a sequence" may be interpreted as at least one of determination of an orthogonal sequence, configuration of an OCC, and determination of a spreading factor. Although the following description illustrates a case where FH is performed once (the 1st hop and the 2nd hop are used) in intra slot FH, the number of times of intra slot FH is not limited to one time.

(First Aspect)

In a first aspect, generation of a DMRS sequence for PUCCH demodulation is controlled based on information indicating whether FH is applied.

The UE controls generation of a DMRS sequence (for example, an orthogonal sequence), based on a notification as to whether FH is applied, regardless of frequency-hop distance of the PUCCH (for example, the 1st hop PRB index (startingPRB) and the 2nd hop PRB index (secondHop-PRB)).

Specifically, when the UE is notified of a higher layer parameter (for example, intraSlotFrequencyHopping) indicating that PUCCH FH (for example, intra slot FH) is enabled, the UE assumes FH, regardless of whether the frequency-hop distance is 0. In other cases, the UE assumes that FH is not applied. Examples of such "other cases" include a case where the UE is not notified of a higher layer parameter indicating that FH is enabled (or a case where "disabled" is configured).

For a case where FH is assumed (intra-slot frequency hopping enabled) and a case where FH is not assumed (no intra-slot frequency hopping), a DMRS sequence may be generated based on a given formula. For example, in DMRS sequence generation, block-wise spreading using an orthogonal sequence (orthogonal sequence $W_i(m)$) may be performed based on Formula (2) below.

[Formula 2]

$$z(m'N_{sc}^{RB}N_{SF,0}^{PUCCH,1} + mN_{sc}^{RB} + n) = w_i(m) \cdot r_{u,v}^{(\alpha,\delta)}(n) \quad \text{Formula (2)}$$
$$n = 0, 1, \ldots, N_{sc}^{RB} - 1$$
$$m = 0, 1, \ldots, N_{SF,m'}^{PUCCH,1} - 1$$
$$m' = \begin{cases} 0 & \text{no intra-slot frequency hopping} \\ 0,1 & \text{intra-slot frequency hopping enabled} \end{cases}$$

z: Transmitted sequence
$N_{sc}^{RB}$: Number of subcarriers in each resource block (RB)
$N_{SF,m'}^{PUCCH,1}$: Spreading factor (SF)
$r_{u,v}^{(\alpha,\delta)}(n)$: Low-PAPR sequence defined by cyclic shift α of certain base sequence ($r_{u,v}^{(\alpha,\delta)}(n)$)

In Formula (2), one OCC is configured (m'=0) when intra slot FH is not applied, and two OCCs are configured (m'=0, 1) when intra slot FH is applied.

For example, when there is a notification of a higher layer parameter (for example, intraSlotFrequencyHopping) indicating that FH is enabled, the 1st orthogonal sequence (orthogonal sequence using m'=0) is applied to the DMRS corresponding to the 1st hop, and the 2nd orthogonal sequence (orthogonal sequence using m'=1) is applied to the DMRS corresponding to the 2nd hop, regardless of the frequency-hop distance.

For example, when the UE is notified of intraSlotFrequencyHopping, and the 1st hop PRB index (startingPRB) and the 2nd hop PRB index (secondHopPRB) are different, different orthogonal sequences (for example, OCCs) may be configured for respective hops (see FIG. 2A).

When the UE is notified of intraSlotFrequencyHopping, different orthogonal sequences (for example, OCCs) are configured for respective hops, even when the 1st hop PRB index (startingPRB) and the 2nd hop PRB index (secondHopPRB) have the same value (see FIG. 2B). In other words, when there is a notification of intraSlotFrequencyHopping (or configuration of intraSlotFrequencyHopping=enabled) and the frequency-hop distance is 0, different orthogonal sequences (for example, OCCs) are configured for respective hops.

In this manner, a UE with the frequency-hop distance being configured to 0 and a UE with the frequency-hop distance being configured to a value other than 0 (the 1st hop PRB index and the 2nd hop PRB index have different values) can be appropriately multiplexed.

Figure 3:
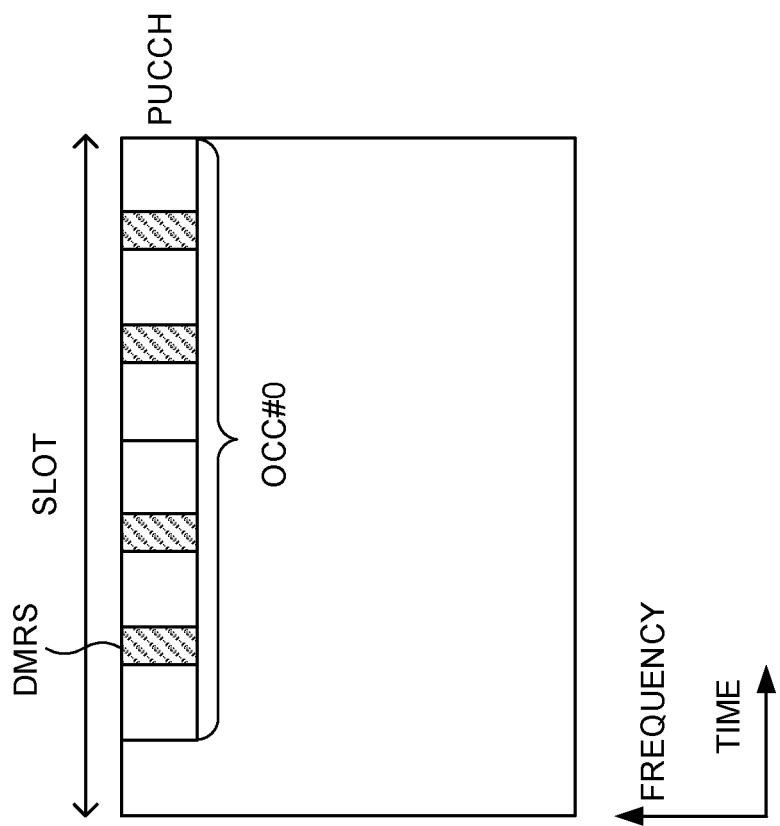
FIG. 3 is a diagram to show another example of an orthogonal sequence determination method according to the first aspect.

When the UE is not notified of a higher layer parameter (for example, intraSlotFrequencyHopping) indicating that FH is enabled, the UE may apply the 1st orthogonal sequence (orthogonal sequence using m'=0) to the DMRS to which FH is not applied (see FIG. 3).

Note that the UE may determine a spreading factor (SF) to be applied to the DMRS, based on presence or absence of a notification of a higher layer parameter indicating that PUCCH FH (for example, intra slot FH) is enabled, regardless of whether the frequency-hop distance is 0.

For example, it is assumed that a table prescribing each of SF for a case where FH is applied (or a case where FH is assumed) and SF for a case where FH is not applied (or a case where FH is not assumed) is prescribed. In this case, the UE may determine SF to be applied with reference to the table, based on presence or absence of a notification of a higher layer parameter indicating that FH is enabled.

In this manner, in the first aspect, the sequence to be applied to the PUCCH and the sequence to be applied to the DMRS for demodulation of the PUCCH are determined based on the higher layer parameter indicating that PUCCH frequency hopping is enabled, regardless of the frequency-hop distance. As a result, base stations and UEs can commonly understand an OCC configuration method, and a UE with the frequency-hop distance being configured to 0 and a UE with the frequency-hop distance being configured to other than 0 can be appropriately multiplexed.

(Second Aspect)

In the second aspect, generation of a DMRS sequence for PUCCH demodulation is controlled based on the frequency-hop distance (also referred to as a PRB offset).

The UE controls generation of a DMRS sequence (for example, an orthogonal sequence), based on the PUCCH frequency-hop distance (for example, the 1st hop PRB index (startingPRB) and the 2nd hop PRB index (secondHopPRB)), regardless of a notification indicating whether FH is applied.

Specifically, when the frequency-hop distance is not 0, the UE assumes FH, regardless of whether the UE is notified of a higher layer parameter (for example, intraSlotFrequencyHopping) indicating that PUCCH FH (for example, intra slot FH) is enabled. In other cases, the UE assumes that FH is not applied. Examples of such "other cases" include a case where the frequency-hop distance is 0.

For a case where FH is assumed (intra-slot frequency hopping enabled) and a case where FH is not assumed (no intra-slot frequency hopping), a DMRS sequence may be generated based on a given formula. For example, in DMRS sequence generation, block-wise spreading using an orthogonal sequence (orthogonal sequence $W_i(m)$) may be performed based on Formula (2) above.

For example, when the frequency-hop distance is not 0 (for example, when frequency-hop distance >0), the 1st orthogonal sequence (orthogonal sequence using m'=0) is applied to the DMRS corresponding to the 1st hop, and the 2nd orthogonal sequence (orthogonal sequence using m'=1) is applied to the DMRS corresponding to the 2nd hop. Such a case where the frequency-hop distance is not 0 is equivalent to a case where different values are notified as the 1st hop PRB index (startingPRB) and the 2nd hop PRB index (secondHopPRB).

Figure 4B:
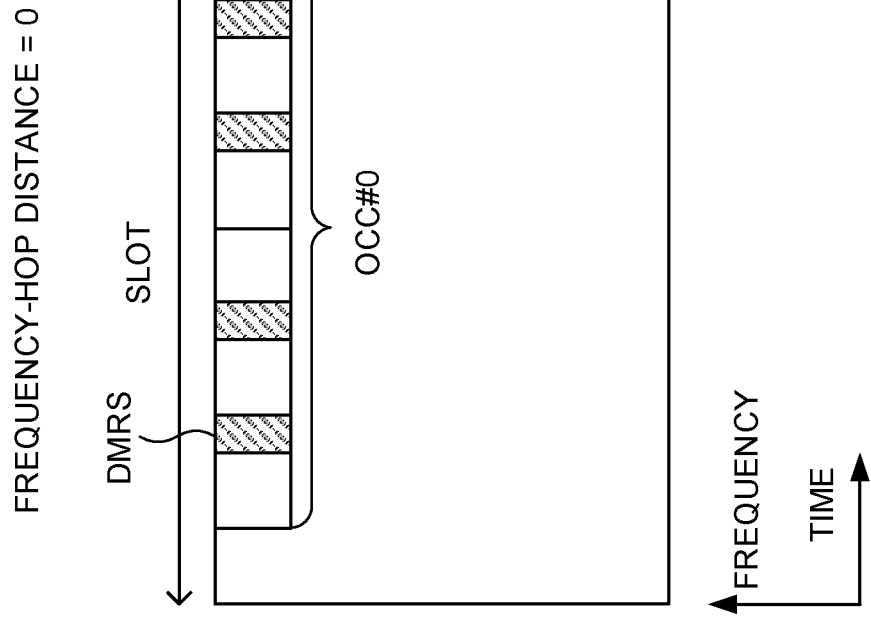
FIG. 4A and FIG. 4B are each a diagram to show an example of an orthogonal sequence determination method according to a second aspect.
Figure 4A:
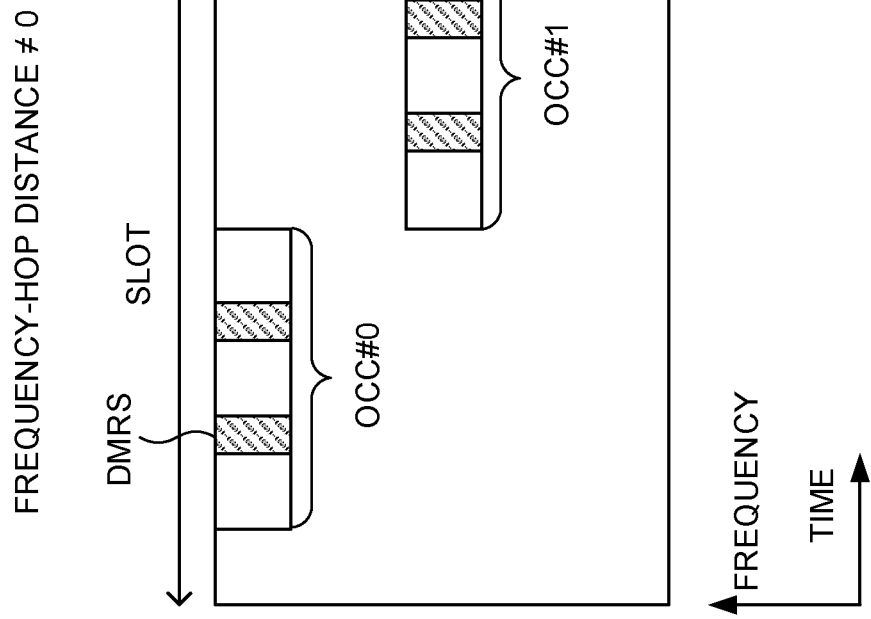

For example, when the 1st hop PRB index (startingPRB) and the 2nd hop PRB index (secondHopPRB) are different from each other, the UE may configure different orthogonal sequences (for example, OCCs) for respective hops (see FIG. 4A).

In contrast, when the 1st hop PRB index (startingPRB) and the 2nd hop PRB index (secondHopPRB) have the same value, the UE configures the same orthogonal sequence (orthogonal sequence using m'=0) for the DMRS corresponding to respective hops, even when there is a notification of intraSlotFrequencyHopping (or even when intraSlotFrequencyHopping=enabled is configured) (see FIG. 4B). In other words, when there is a notification of intraSlotFrequencyHopping (or configuration of intraSlotFrequencyHopping=enabled) and the frequency-hop distance is 0, an orthogonal sequence (or an OCC) common to both the hops is configured.

Note that the UE may determine a spreading factor (SF) to be applied to the DMRS, based on whether the frequency-hop distance is 0, regardless of whether there is a notification of a higher layer parameter indicating that PUCCH FH (for example, intra slot FH) is enabled.

For example, it is assumed that a table prescribing each of SF for a case where FH is applied (or a case where FH is assumed) and SF for a case where FH is not applied (or a case where FH is not assumed) is prescribed. In this case, the UE may determine SF to be applied with reference to the table, based on the frequency-hop distance.

In this manner, in the second aspect, the sequence to be applied to the DMRS for PUCCH demodulation is determined based on the frequency-hop distance, regardless of the higher layer parameter indicating that PUCCH frequency hopping is enabled. As a result, base stations and UEs can commonly understand an OCC configuration method.

(Radio Communication System)

Hereinafter, a structure of a radio communication system according to one embodiment of the present invention will be described. In this radio communication system, the radio communication method according to each embodiment of the present invention described above may be used alone or may be used in combination for communication.

Figure 5:
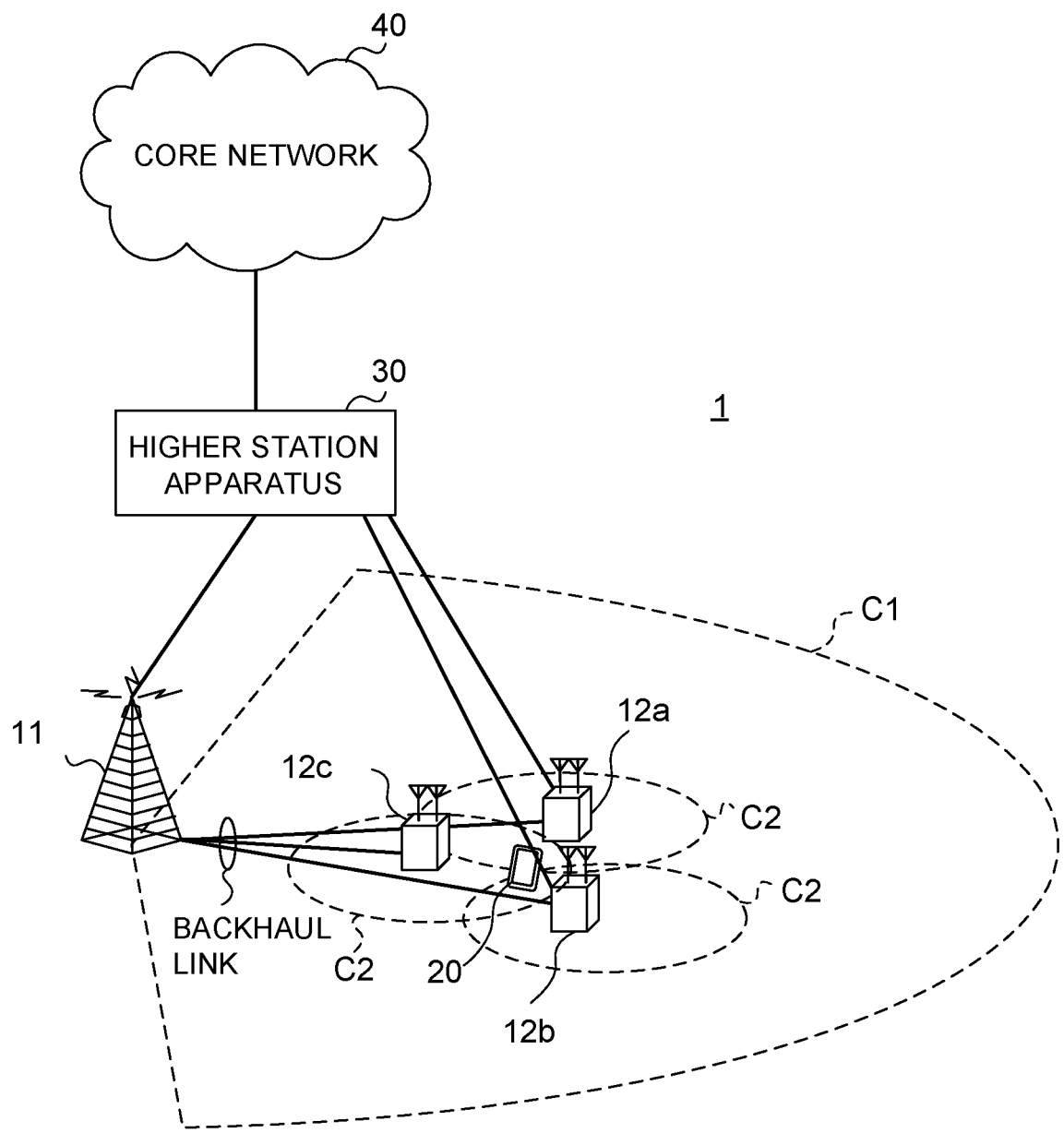
FIG. 5 is a diagram to show an example of a schematic structure of a radio communication system according to the present embodiment.

FIG. 5 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to those shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can apply CA or DC by using a plurality of cells (CCs) (for example, five or less CCs or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

A wired connection (for example, an optical fiber in compliance with the CPRI (Common Public Radio Interface), an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands including one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. In addition, the MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 6:
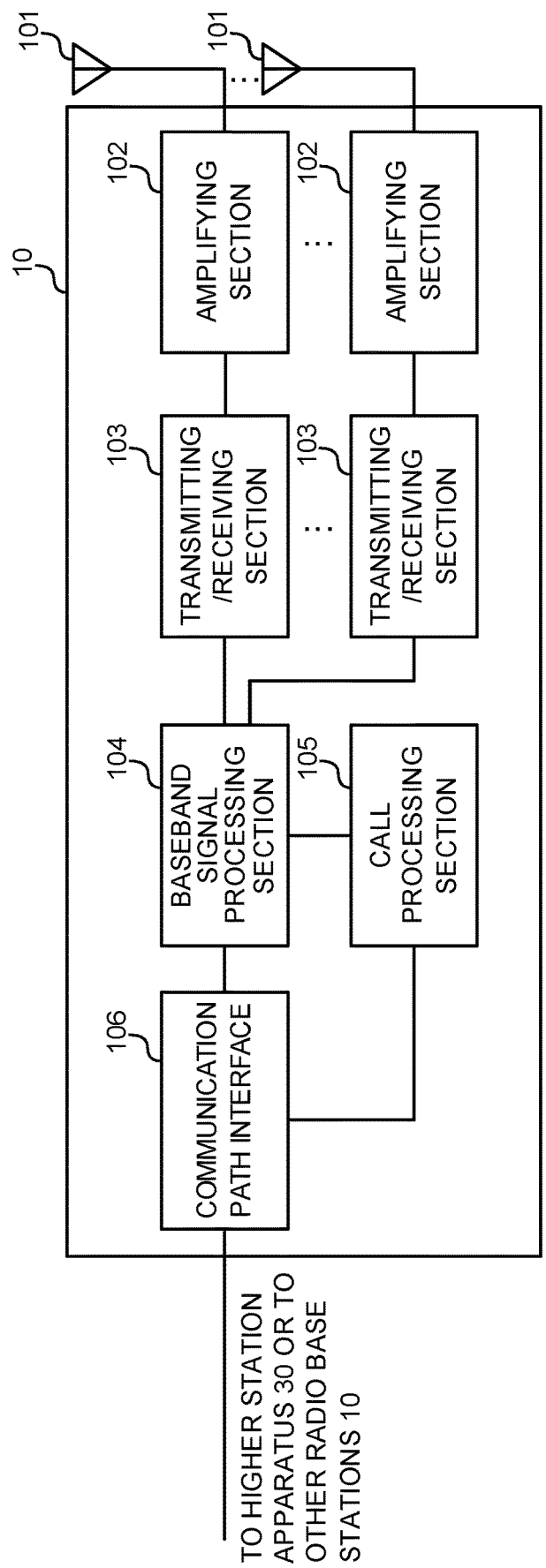
FIG. 6 is a diagram to show an example of an overall structure of a radio base station according to the present embodiment.

FIG. 6 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. Each transmitting/receiving section 103 can be configured by a transmitter/receiver, a transmitting/receiving circuit or a transmitting/receiving apparatus that can be described based on general understanding of the technical field to which the present invention pertains. Note that each transmitting/receiving section 103 may be structured as a transmitting/receiving section in one entity, or may be configured by a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 transmit at least one of frequency hopping information indicating whether or not frequency hopping of an uplink control channel is enabled (for example, PUCCH-frequency-hopping or intraSlotFrequencyHopping) and information related to frequency hop resources (for example, startingPRB and secondHopPRB).

Figure 7:
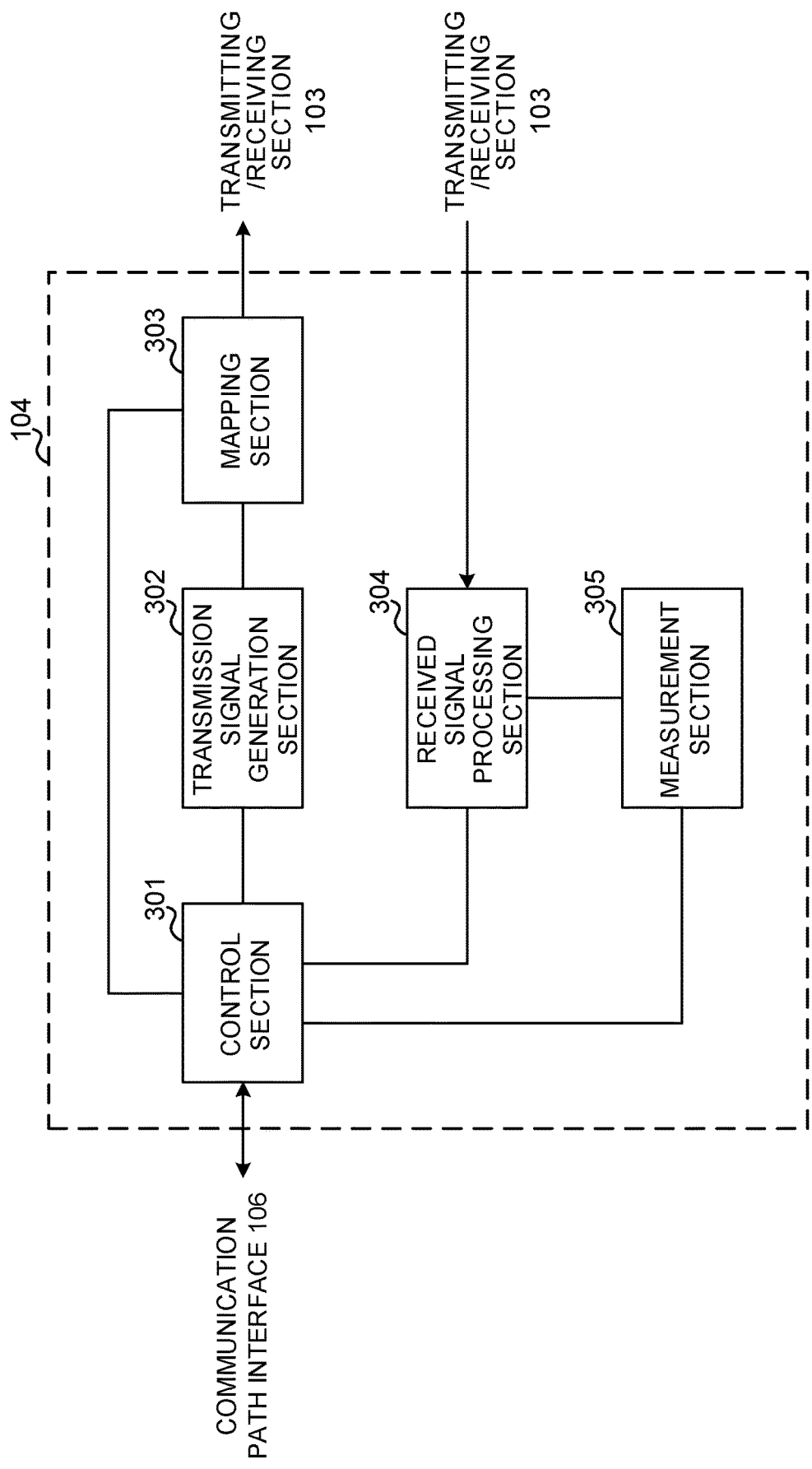
FIG. 7 is a diagram to show an example of a functional structure of the radio base station according to the present embodiment.

FIG. 7 is a diagram to show an example of a functional structure of the radio base station according to one embodiment of the present invention. Note that, the present example primarily shows functional blocks that pertain to characteristic parts of the present embodiment, and it is assumed that the radio base station 10 includes other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be configured by a controller, a control circuit or control apparatus that can be described based on general understanding of the technical field to which the present invention pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH, transmission confirmation information, and so on), a random access preamble (for example, a signal transmitted on the PRACH), an uplink reference signal, and so on.

The control section 301 may control reception of the PUCCH and the demodulation reference signal for the PUCCH, based on at least one of frequency hopping information and a distance between frequency hops. For example, the control section 301 may determine a sequence to be applied to the demodulation reference signal for the PUCCH, based on at least one of the frequency hopping information and the distance between the frequency hops.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be configured by a signal generator, a signal generation circuit or signal generation apparatus that can be described based on general understanding of the technical field to which the present invention pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to given radio resources, based on commands from the control section 301, and outputs these to the transmitting/receiving sections 103. The mapping section 303 can be configured by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be configured by a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be configured by a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), a signal strength (for example, RSSI (Received Signal Strength Indicator)), channel information (for example, CSI), and so on. The measurement results may be output to the control section 301.

<User Terminal>

Figure 8:
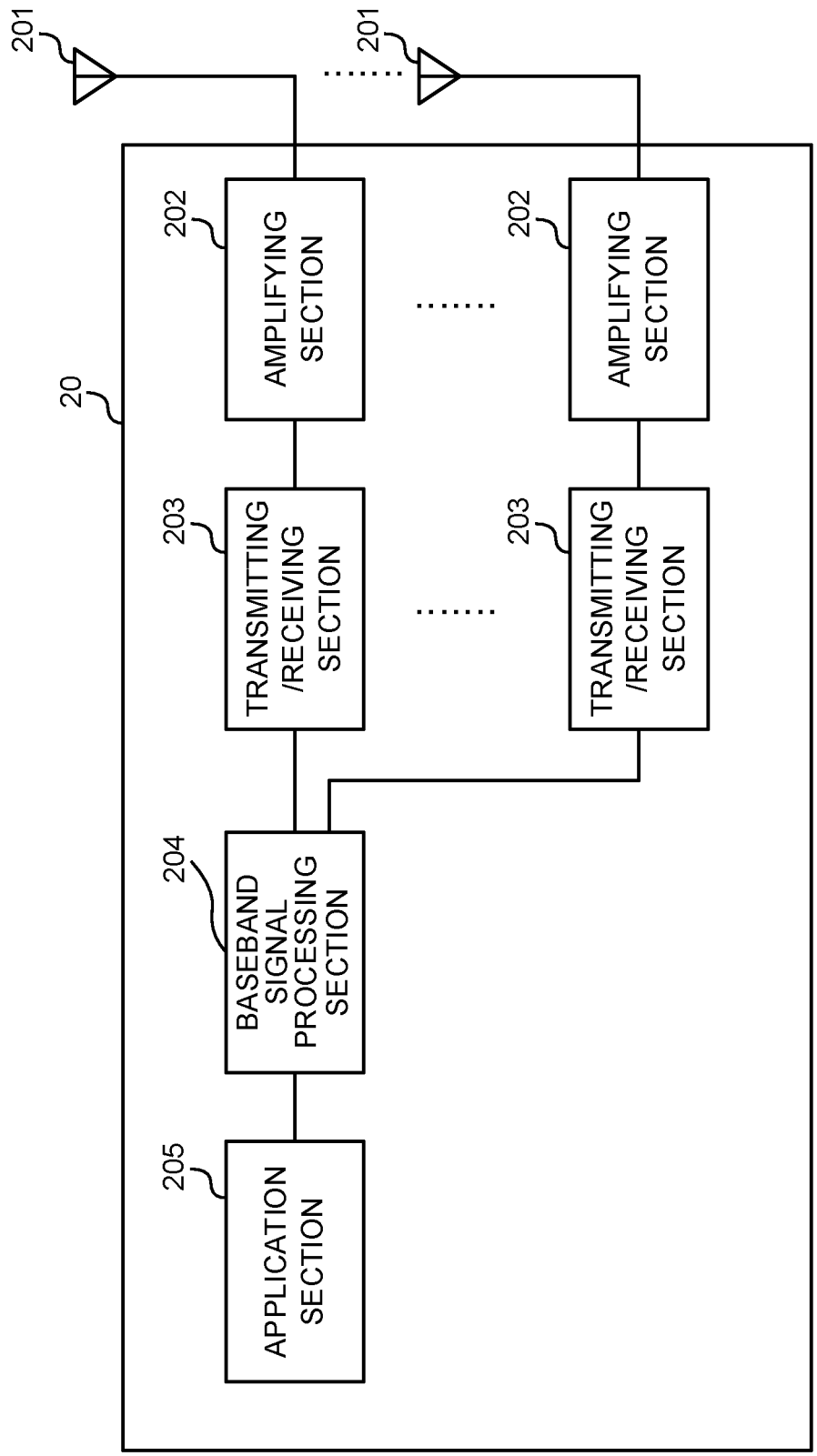
FIG. 8 is a diagram to show an example of an overall structure of a user terminal according to the present embodiment.

FIG. 8 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. Each transmitting/receiving section 203 can be configured by a transmitters/receiver, a transmitting/receiving circuit or a transmitting/receiving apparatus that can be described based on general understanding of the technical field to which the present invention pertains. Note that each transmitting/receiving section 203 may be structured as a transmitting/receiving section in one entity, or may be configured by a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 receive at least one of frequency hopping information indicating whether or not frequency hopping of an uplink control channel is enabled (for example, PUCCH-frequency-hopping or intraSlotFrequencyHopping) and information related to frequency hop resources (for example, startingPRB and secondHopPRB).

Figure 9:
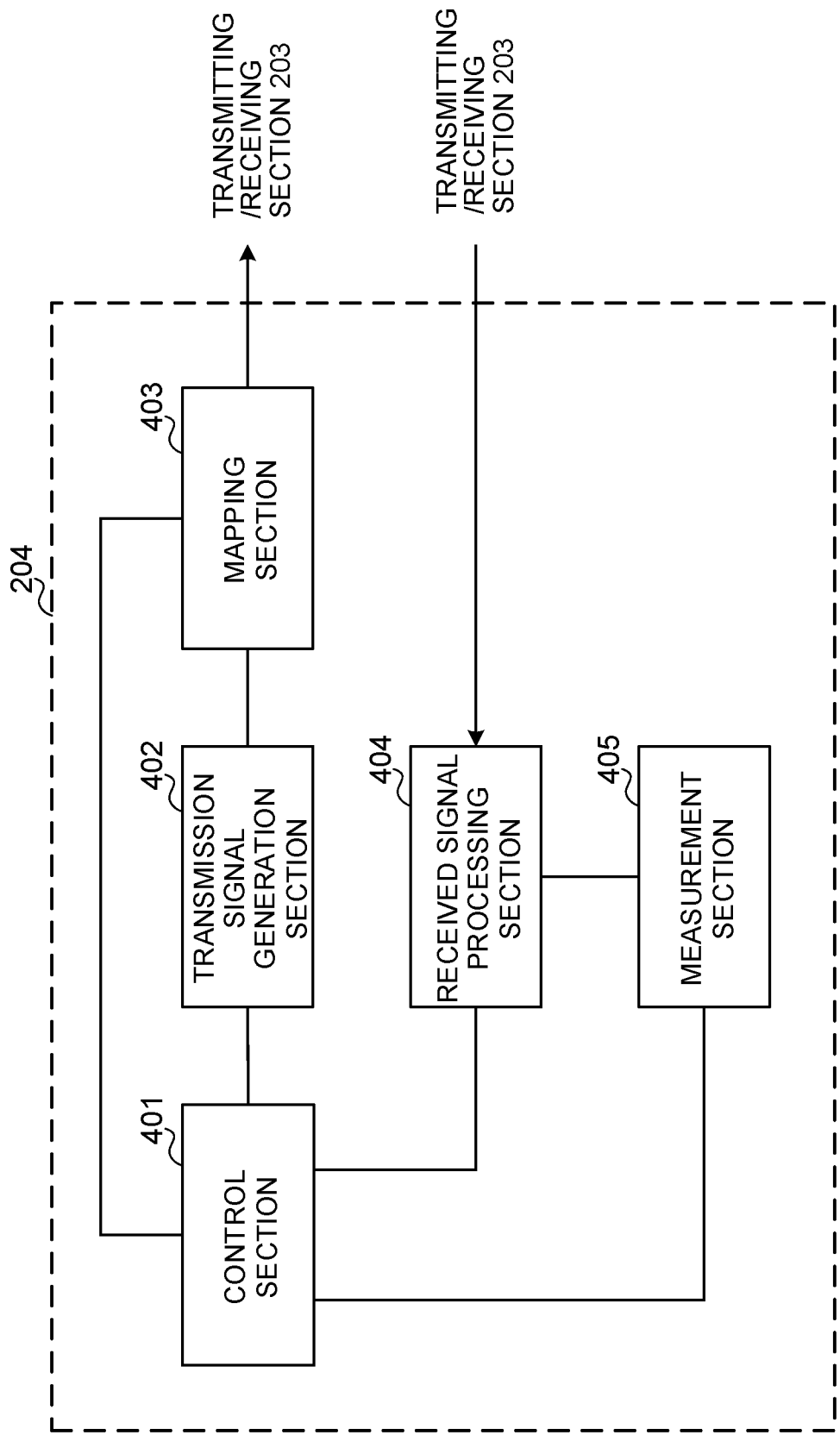
FIG. 9 is a diagram to show an example of a functional structure of the user terminal according to the present embodiment.

FIG. 9 is a diagram to show an example of a functional structure of a user terminal according to one embodiment of the present invention. Note that, the present example primarily shows functional blocks that pertain to characteristic parts of the present embodiment, and it is assumed that the user terminal 20 includes other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be configured by a controller, a control circuit or control apparatus that can be described based on general understanding of the technical field to which the present invention pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 determines a sequence (for example, an orthogonal sequence), or generates a sequence, to be applied to the demodulation reference signal for the uplink control channel, based on at least one of the frequency hopping information and the distance between the frequency hops.

For example, when the frequency hopping is configured to be enabled according to the frequency hopping information, the control section 401 may assume that the frequency hopping is applied to the demodulation reference signal, regardless of the distance between the frequency hops (first aspect). When the frequency hopping is configured to be enabled according to the frequency hopping information, the control section 401 may apply different orthogonal sequences to the demodulation reference signal corresponding to the respective frequency hops.

Alternatively, when the distance between the frequency hops is not 0, the control section 401 may assume that the frequency hopping is applied to the demodulation reference signal, regardless of the frequency hopping information (second aspect). When the distance between the frequency hops is 0, the control section 401 may apply the same orthogonal sequence to the demodulation reference signal corresponding to the respective frequency hops.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be configured by a signal generator, a signal generation circuit or signal generation apparatus that can be described based on general understanding of the technical field to which the present invention pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be configured by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be configured by a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be configured by a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ and SINR), a signal strength (for example, RSSI), channel information (for example, CSI), and so on. The measurement results may be output to the control section 401.

<Hardware Structure>

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus.

Figure 10:
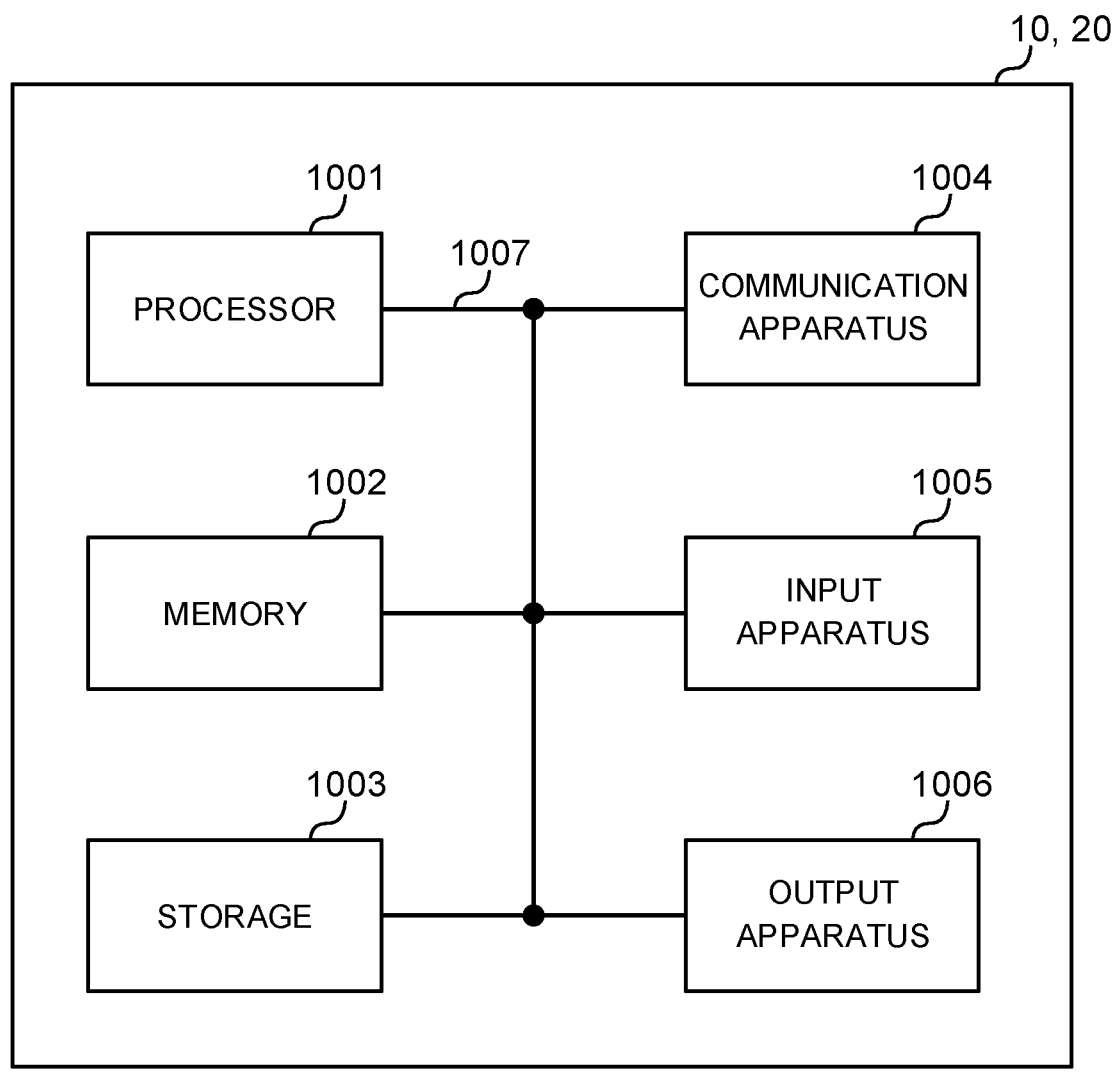
FIG. 10 is a diagram to show an example of a hardware structure of the radio base station and the user terminal according to the present embodiment.

For example, a radio base station, a user terminal, and so on according to one embodiment of the present disclosure may function as a computer that executes the processes of the radio communication method of the present disclosure. FIG. 10 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the radio base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured by a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of user terminal 20 may be implemented by control programs that are stored in the memory 1002 and that operate on the processor 1001, and other functional blocks may be implemented likewise.

The memory 1002 is a computer-readable recording medium, and may be configured by, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be formed by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, a mini-slot, and a symbol in the present disclosure may be interchangeably interpreted.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminals in TTI units. Note that the definition of TTIs is not limited to this.

TTIs may be transmission time units for channel-encoded data packets (transport blocks), code blocks, codewords, and so on, or may be the unit of processing in scheduling, link adaptation, and so on. Note that, when TTIs are given, the time interval (for example, the number of symbols) to which transport blocks, code blocks, codewords, and so on are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common RBs (common resource blocks) for a certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies is also included in the definition of communication media.

The terms "system" and "network" used in the present disclosure may be used interchangeably.

In the present disclosure, the terms such as a "base station (BS)," a "radio base station," a "fixed station," a "NodeB," an "eNodeB (eNB)," a "gNodeB (gNB)," an "access point," a "transmission point," a "reception point," a "transmission/reception point," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms such as "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," and so on. Note that at least one of a base station and a mobile station may be a device mounted on a mobile entity or a mobile entity itself, and so on. The mobile entity may be a vehicle (for example, a car, an airplane, and the like), may be a mobile entity which moves unmanned (for example, a drone, an automatic operation car, and the like), or may be a robot (a manned type or unmanned type). Note that at least one of a base station and a mobile station also includes an apparatus which does not necessarily move during communication operation.

Furthermore, the radio base station in the present disclosure may be interpreted as a user terminal. For example, each aspect/embodiment of the present disclosure may be applied to the structure that replaces a communication between a radio base station and a user terminal with a communication between a plurality of user terminals (for example, which may be referred to as "D2D (Device-to-Device)," "V2X (Vehicle-to-Everything)," and the like). In this case, the user terminals 20 may have the functions of the radio base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as a radio base station. In this case, the radio base stations 10 may have the functions of the user terminals 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these, for example. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure as a convenient way, for distinguishing between two or more elements. Thus, reference to the first and second elements does not imply that only two elements may be employed, or that the first element must precede the second element in some way.

The term "judging (determining)" as used in the present disclosure may encompass a wide variety of actions. For example, "judging (determining)" may be interpreted to mean making "judgments (determinations)" about judging, calculating, computing, processing, deriving, investigating, looking up (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables, printed electrical connections, and the like, and, as some non-limiting and non-inclusive examples, by using electromagnetic energy having wavelengths in radio frequency regions, microwave regions, (both visible and invisible) light regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:
1. A terminal comprising:
   a transmitter that transmits a demodulation reference signal for an uplink control channel;
   a receiver that receives:
      frequency hopping information indicating that frequency hopping of the uplink control channel is enabled, information regarding a resource block index corresponding to a first frequency hop and a resource block index corresponding to a second frequency hop; and a processor that determines a sequence of the demodulation reference signal based on the frequency hopping information regardless of whether a distance between the first frequency hop and the second frequency hop is zero.

2. The terminal according to claim 1, wherein when the frequency hopping information is notified, the processor generates the sequence corresponding to each of a plurality of values regarding a case where the frequency hopping is enabled, for the demodulation reference signal even if distance between the first frequency hop and the second frequency hop is zero.

3. The terminal according to claim 2, wherein when the frequency hopping information is not notified, the processor generates the sequence corresponding to one value for the demodulation reference signal.

4. The terminal according to claim 1, wherein when the frequency hopping information is not notified, the processor generates the sequence corresponding to one value regarding a case where the frequency hopping is not enabled, for the demodulation reference signal.

5. A radio communication method comprising:
receiving:
    frequency hopping information indicating that frequency hopping of an uplink control channel is enabled,
    information regarding a resource block index corresponding to a first frequency hop and a resource block index corresponding to a second frequency hop; and
determining a sequence of a demodulation reference signal for the uplink control channel based on the frequency hopping information regardless of whether a distance between the first frequency hop and the second frequency hop is zero.

6. A base station comprising:
a transmitter that transmits:
frequency hopping information indicating that frequency hopping of an uplink control channel is enabled,
information regarding a resource block index corresponding to a first frequency hop and a resource block index corresponding to a second frequency hop; and
a processor that controls a reception of a demodulation reference signal for the uplink control channel, by which a sequence is determined based on the frequency hopping information regardless of whether a distance between the first frequency hop and the second frequency hop is zero.

7. A system comprising a terminal and a base station:
the terminal comprising:
    a transmitter that transmits a demodulation reference signal for an uplink control channel;
    a receiver that receives:
        frequency hopping information indicating that frequency hopping of the uplink control channel is enabled,
        information regarding a resource block index corresponding to a first frequency hop, and
        information regarding a resource block index corresponding to a second frequency hop; and
    a processor that determines a sequence of the demodulation reference signal based on the frequency hopping information regardless of whether a distance between the first frequency hop and the second frequency hop is zero:
the base station comprising:
    a transmitter that transmits:
        the frequency hopping information,
        the information regarding the resource block index corresponding to the first frequency hop, and
        the information regarding the resource block index corresponding to the second frequency hop; and
    a processor that controls a reception of the demodulation reference signal.

* * * * *